Patented Dec. 1, 1931

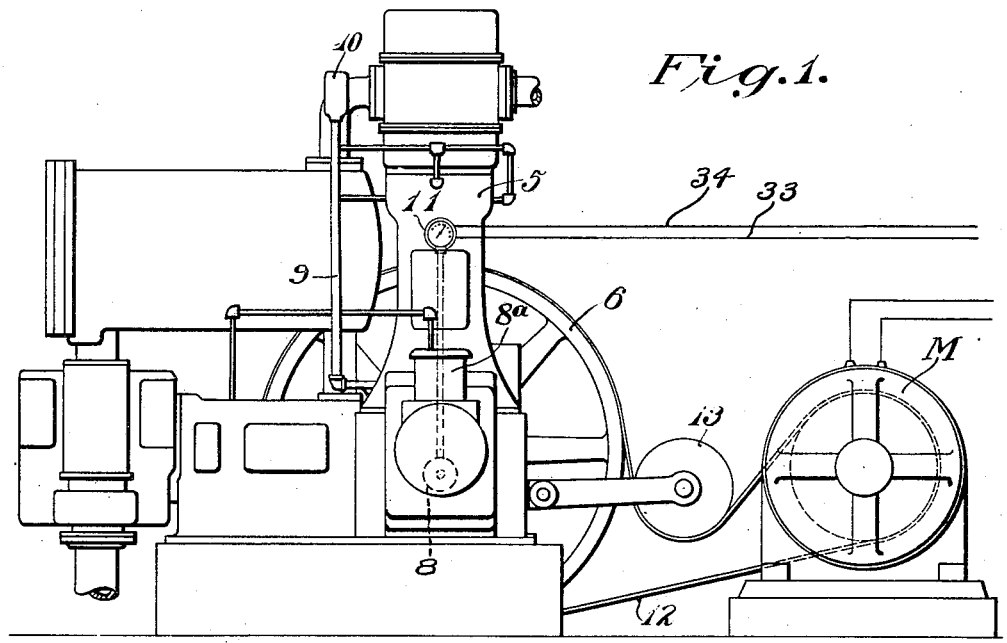
Fig.1.
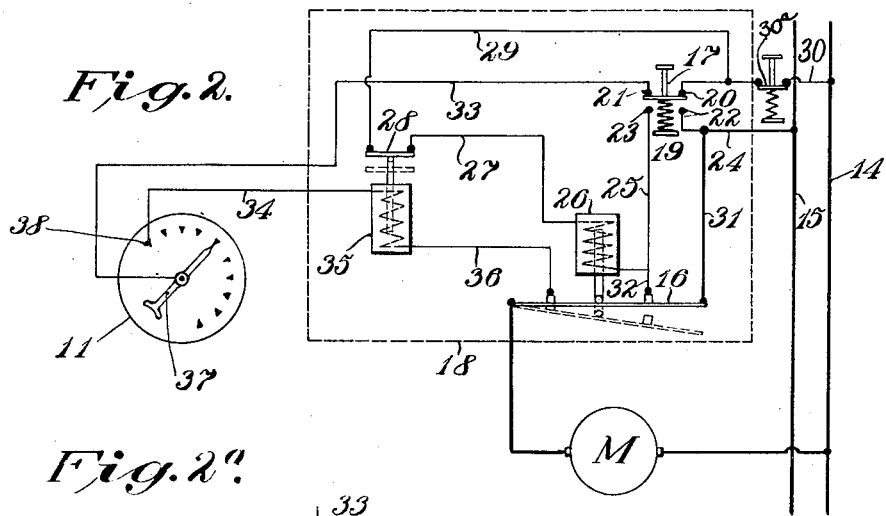
Fig.2.
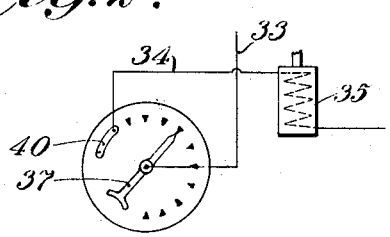
Fig.2ª.
Inventor:
Wade H. Wineman.
by Louis A. Maxson
Atty.

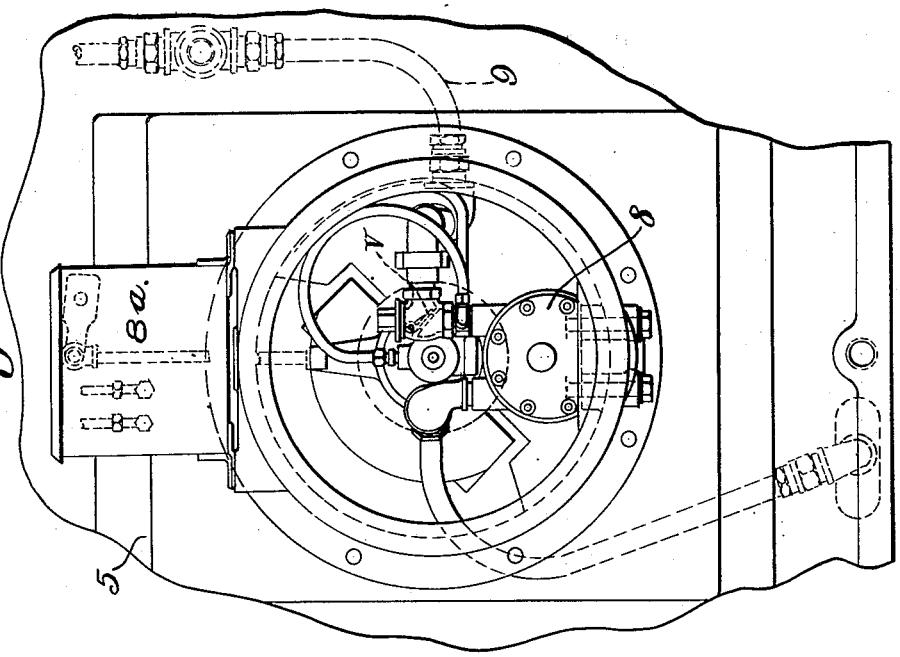
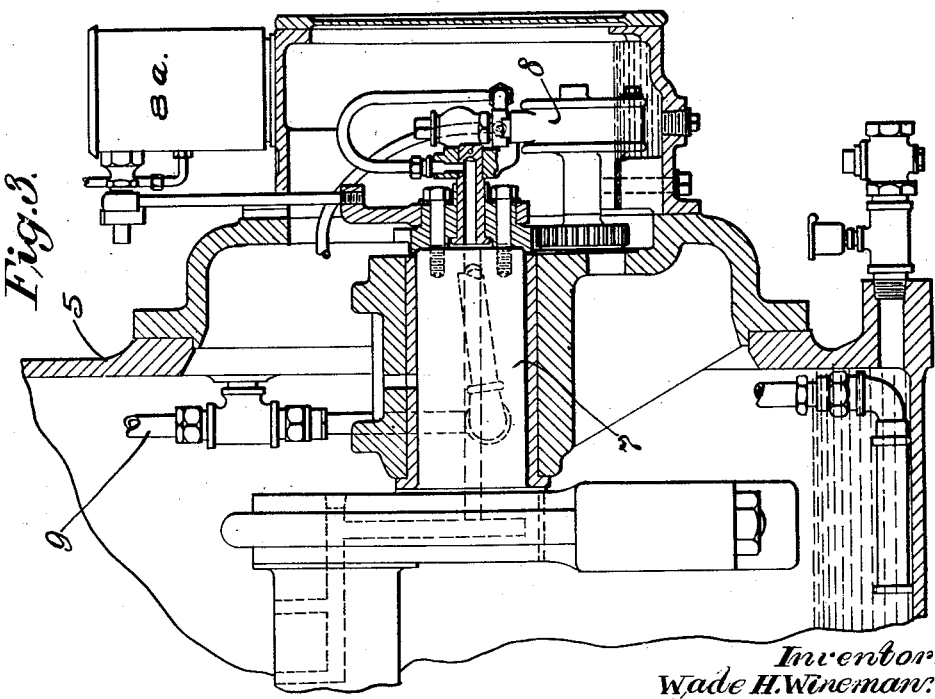

1,834,600

UNITED STATES PATENT OFFICE

WADE H. WINEMAN, OF MICHIGAN CITY, INDIANA, ASSIGNOR TO SULLIVAN MACHINERY COMPANY, A CORPORATION OF MASSACHUSETTS

LUBRICATING DEVICE

Application filed December 27, 1929. Serial No. 417,013.

My invention relates to means for lubricating the bearings of a compressor and one aim of the invention is to provide improved means for guarding against injury to these bearings due to lack of lubricant.

It is customary to provide, for installation with each compressor, an oil gage designed to indicate to the operator the pressure under which the lubricant is being supplied to the crank pin of the compressor. It has been the practice to rely on the operator to watch the gage and not let the compressor run when insufficient lubricant is being supplied to the bearings of the machine. My invention relates to means for automatically preventing running of the compressor whenever the pressure of this lubricant drops below a predetermined point. In connection with certain more specific aspects of the invention, the same relates to a safety device cooperating with the starting and stopping panel for the electric driving motor of the compressor, this device being arranged to prevent running of the motor should the pressure, under which the lubricant is supplied to the bearings, fall below a predetermined point.

One object of my invention is to provide improved controlling means for shutting down the driving motor of a compressor, should the pressure under which the lubricant is supplied to the bearings of the compressor drop below a predetermined point. A further object of my invention is to provide improved means automatically operative to stop a compressor upon the lowering of the pressure under which lubricant is supplied to the bearings of the compressor. A further and more specific object of my invention is to provide, in combination with the starting panel of an electric motor for driving a compressor, a safety device for stopping the motor should the pressure under which the lubricant is supplied to the compressor bearing drop below a predetermined point.

For purposes of illustrating my invention I have shown, as one embodiment which the same may assume, an angle compound compressor driven by an electric motor, the controlling devices for the motor including a safety device which is responsive to the position of an oil gage which indicates the pressure of the lubricant which is being supplied to the bearings of the compressor.

An illustrative form which the invention may assume in practice is shown in the accompanying drawings, in which, Fig. 1 is a diagrammatic view in side elevation of an angle compound compressor driven by an electric motor.

Fig. 2 is a wiring diagram for the motor, including a starting panel and a circuit controlled by the pressure gage of the compressor.

Fig. 2ª is a detail of a modified form of the wiring diagram shown in Fig. 2.

Fig. 3 is a vertical sectional detail view showing a lubricant pump driven by the crank shaft of the compressor.

Fig. 4 is an end elevation of the mechanism shown in Fig. 3.

Referring to these drawings, an angle compound compressor 5 has a flywheel 6 fixed to a crank shaft 7, which is lubricated by oil or other material forced into the bearing directly from the lubricant pump 8. The pump 8 is driven by the crank shaft 7 and therefore pumps lubricant whenever the crank shaft is rotating. The pump 8 supplies oil or other lubricating material past a check valve V through a pipe 9 to a reservoir 10, from which lubricant is supplied through supply passages to the various other bearings of the compressor. A separate lubricant pump 8ª may be used to supply lubricant to the cylinders if desired. It will be obvious that the crank pin will be the first bearing which will lack lubricant should the pump fail to operate, or should the supply line become closed. The other bearings of the compressor would be supplied with lubricant for a substantial period of time after failure of the pump, because a supply of lubricant is stored up in the reservoir 10. A pressure gage 11 indicates the pressure at which the lubricant is supplied by the pump 8 to the crank pin.

The compressor is driven by an electric motor M, the motor being connected to the flywheel 6 by means of a belt 12 passing under an idler pulley 13 which keeps the belt under tension. The current flows from the lines 14, 15 to the motor M under control of a main contactor 16 which, when the motor is shut down, is in the dotted position shown in Fig. 2. A push button 17 is provided on the starting panel 18 for starting the motor. Due to the pressure of a spring 19 the button 17 is normally in the position shown in full lines in Fig. 2 and bridges the space between the contacts 20 and 21. When the button 17 is pushed in, a circuit is completed between the contacts 22 and 23 and current will flow from line 15 through a control circuit which includes the wire 24, the switch controlled by button 17, wire 25, solenoid 26, wire 27, switch 28, wire 29 and wire 30 back to line 14. The solenoid 26 is thereupon energized to draw the contactor 16 into closed position and the motor is started.

It will be noted that the main line contactor 16 completes the circuit between lines 31 and 32; and that, therefore, as soon as the solenoid 26 has brought the main line contactor into closed position, the contacts 22 and 23 are short-circuited. The operator may, therefore, release the button 17 to the position shown in Fig. 2, thereby completing a connection leading from the main line 14 through wire 30 and wire 33 to the pointer 37 of the pressure gage 11. A connection has been completed by the closing of the main contactor 16, leading from the main line 15 through wire 24, wire 31, the main contactor 16, wire 36, a solenoid 35 and wire 34 to a contact 38, which may be placed at any predetermined point on the pressure gage. This point is chosen so as to insure that the compressor will be supplied with sufficient lubricant, and therefore is set at a somewhat higher pressure than the minimum pressure at which lubricant should be supplied to lubricate the compressor with safety. It will be noted that the operator should depress the button 17, and hold the same depressed until the pointer 37 has passed the contact 38, or in other words, until sufficient pressure has been built up by the pump 8 to insure safe running of the compressor. Should, at any time during the running of the compressor, the lubricant pressure drop low enough so that the pointer 37 comes in contact with the contact 38, a circuit is completed between wires 14 and 15 and the solenoid 35 is energized. The switch 28 is accordingly opened, and the control circuit is broken, so that solenoid 26 is deenergized. The main line contactor 16 is therefore immediately opened, and the motor is stopped. The motor may be stopped at any time by depressing switch 30ª.

As a result of my invention, it will be noted that any failure of the lubricant supply pressure will cause the pointer 37 on the gage 11 to complete a circuit which energizes solenoid 35. It will furthermore be noted that this gage is responsive to the pressure at which oil or other lubricant is supplied to the crank pin of the crank shaft 7; and since this is the first bearing which would lack lubricant, the safety of all the bearings of the compressor is insured. As a modification of the arrangement shown in Fig. 2, I may provide on the gage 11 a continuous contact 40 from zero pressure to the contact 38, such as is shown in Fig. 2ª. This would complete the circuit through the solenoid 35, should the operator release the push button 17 at any time before the motor had attained sufficient speed to bring the pressure of the lubricant up to the safe pressure. This would prevent the operator from starting the motor and letting the compressor run without the oil pressure ever reaching the point at which the contact 38 is set.

My improved controlling mechanism is simple in its operation and yet positively breaks the circuit through the motor, thereby bringing the compressor to a stop, whenever the oil pressure falls below the safety point. The operator is relieved from the necessity for constant observance of the pressure of the lubricant, and under all circumstances my improved mechanism acts as a safeguard to prevent burning out of any of the bearings.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a controlling mechanism for the motor of a motor driven compressor, the combination, including a movable element responsive to the pressure at which lubricant is supplied to a bearing of the compressor, a device for starting and stopping the motor, manually operated means for controlling said device having a starting and a normal running position, and means controlled by said element for operating said starting and stopping device when said manually controlled means is in normal position.

2. In a controlling mechanism for the motor of a motor driven compressor, the combination including a movable element responsive to the pressure at which lubricant is supplied to a bearing of the compressor, a device for starting and stopping the motor, electrically actuated means for maintaining said device in starting position, and means controlled by said movable element for stopping the supply of current to said electrically actuated means.

3. In combination, a compressor including a crank shaft, said compressor having passage means for conducting lubricant to the crank pin and other passage means for conducting lubricant to other bearings of the compressor, a reservoir for supplying lubricant to said other passage means, and a pump driven by said crank shaft for delivering lubricant directly to said passage means leading to the crank pin and for delivering lubricant to said reservoir for said other bearings, a pressure gage having an element movable in response to the changes in the pressure of the lubricant delivered by said pump for lubricating said crank pin, a motor for driving said compressor, and means controlled by an electric circuit including said movable element for stopping said motor when said pressure drops below a predetermined value.

4. In a controlling mechanism for the motor of an electrically driven compressor, the combination having a lubricant pump including a movable element responsive to the pressure at which lubricant is delivered by the pump, a contactor for opening the circuit supplying current to the motor, manually operated means for controlling said contactor having a starting and a normal running position, and means controlled by a circuit including said element for operating said contactor when said manually controlled means is in normal running position.

5. In combination, a fluid pump, an electric motor for driving the same, a lubricant pump for supplying lubricant to a bearing of said fluid pump, and means for controlling stopping and starting of said fluid pump including a main line contactor, an electrically actuated device adapted to position said contactor, a movable element responsive to the discharge pressure of said lubricant pump, and means including a circuit opened and closed by said movable element for controlling said device, whereby said contactor is opened when said lubricant pressure falls to a predetermined value.

6. In a controlling mechanism for a motor driven pump, in combination, an element movable in response to the pressure of lubricant supplied to a bearing of a pump, a device for controlling driving of the pump, and means including an electric circuit controlled by said element and closed at subnormal pressures for causing said device to interrupt driving of said pump.

7. In a controlling mechanism for a motor driven pump, the combination including a movable element responsive to the pressure at which lubricant is supplied to a bearing of the pump, a device for initiating driving of the pump by its driving motor, electrically actuated means for maintaining said device in position to effect pump driving, and means controlled by said movable element for stopping the supply of current to said electrically actuated means.

8. In a controlling mechanism for a motor driven pump, in combination, means for controlling driving of said pump by said motor including an electro magnet, operator controlled means for effecting energization of said magnet, means responsive to lubricant pressure at a bearing of said pump for controlling energization of said magnet, and means controlled by said operator controlled means for precluding control by said lubricant pressure responsive means during operation of said operator controlled means to effect energization of the magnet.

In testimony whereof I affix my signature.

WADE H. WINEMAN.

CERTIFICATE OF CORRECTION.

Patent No. 1,834,600. December 1, 1931.

WADE H. WINEMAN.

It is hereby certified that error appears in the printed specification of the above numbered patent requiring correction as follows: Page 2, line 107, claim 1, strike out the comma before "including"; page 3, lines 18 and 19, claim 4, strike out the comma and words ", the combination", and same claim, line 19, after the word "pump" insert the comma and words , the combination; and that the said Letters Patent should be read with these corrections therein that the same may conform to the record of the case in the Patent Office.

Signed and sealed this 11th day of October, A. D. 1932.

(Seal)

M. J. Moore,
Acting Commissioner of Patents.